(12) United States Patent
Jeon et al.

(10) Patent No.: US 12,441,409 B2
(45) Date of Patent: Oct. 14, 2025

(54) ROOF STRUCTURE OF VEHICLE AND ASSEMBLY METHOD THEREOF

(71) Applicants: Hyundai Motor Company, Seoul (KR); Kia Corporation, Seoul (KR)

(72) Inventors: Chan Woong Jeon, Incheon (KR); Youngrock Kim, Gwangmyeong-si (KR); HaeHoon Lee, Seoul (KR); Chang Hak Kang, Hwaseong-si (KR); Sang Kyoung Han, Gunpo-si (KR); Kwangok Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 386 days.

(21) Appl. No.: 18/183,345

(22) Filed: Mar. 14, 2023

(65) Prior Publication Data

US 2024/0124065 A1    Apr. 18, 2024

(30) Foreign Application Priority Data

Oct. 13, 2022 (KR) .......................... 10-2022-0131196

(51) Int. Cl.
*B62D 25/06* (2006.01)
*B62D 27/02* (2006.01)

(52) U.S. Cl.
CPC ........... *B62D 25/06* (2013.01); *B62D 27/023* (2013.01)

(58) Field of Classification Search
CPC ........ B62D 25/02; B62D 25/04; B62D 25/06; B62D 25/08; B62D 31/00; B62D 31/02; B62D 31/025; B62D 27/023; B62D 65/02; B62D 65/04; B62D 65/024; B62D 65/06
USPC ................. 296/193.05, 6, 9, 12, 215, 29, 30
See application file for complete search history.

(56) References Cited

U.S. PATENT DOCUMENTS

| 5,671,968 A * | 9/1997 | Masuda | B62D 25/025 296/210 |
| 5,873,618 A * | 2/1999 | Ejima | B62D 25/06 296/30 |
| 2014/0312656 A1* | 10/2014 | Gim | B62D 25/06 296/210 |

* cited by examiner

Primary Examiner — Dennis H Pedder
(74) Attorney, Agent, or Firm — Slater Matsil, LLP

(57) ABSTRACT

An embodiment roof structure of a vehicle is provided. The roof structure is coupled to side structures disposed along a vehicle width direction and is configured to mount a roof module. The roof structure includes a side upper reinforce assembly coupled to an upper interior of the side structures along a vehicle length direction and a plurality of roof rail assemblies arranged along the vehicle length direction, each of the plurality of roof rail assemblies being coupled to the side upper reinforce assembly by extending along the vehicle width direction into a cross-sectional interior of an upper portion of each of the side structures.

18 Claims, 12 Drawing Sheets

ROOF STRUCTURE OF VEHICLE AND ASSEMBLY METHOD THEREOF

CROSS-REFERENCE TO RELATED APPLICATIONS

This application claims the benefit of Korean Patent Application No. 10-2022-0131196, filed on Oct. 13, 2022, which application is hereby incorporated herein by reference.

TECHNICAL FIELD

The present disclosure relates to a vehicle body of a vehicle.

BACKGROUND

Recently, the automobile industry is introducing a new concept of future mobility vision for realizing a human-centered, dynamic future city. One of these future mobility solutions is a purpose-built vehicle (PBV) as a purpose-based mobility.

An electric vehicle (EV)-based environment-friendly mobile vehicle may be an example of a PBV. These PBVs may set the optimal route for each situation by utilizing artificial intelligence and unmanned autonomous driving and may also perform platooning.

The PBV may provide users with a variety of customized services during the time of traveling to a destination on the ground through artificial intelligence and autonomous driving methods. To this end, PBVs may be manufactured in a one box design with a large interior space.

In an example, a large-area roof panel is applied to a roof structure of a PBV to provide a user with a large interior space. In another example, in a PBV, roof glass (e.g., roof glass or sunroof glass) is applied to a roof structure in order to provide a sense of openness to users in the interior space.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a vehicle body of a vehicle. Particular embodiments relate to a roof structure of a vehicle body for a purpose-built vehicle (PBV) and an assembly method thereof.

Embodiments of the present disclosure provide a roof structure of a vehicle and an assembly method thereof capable of securing strength of the vehicle body configured in the one-box design and mounting various functional parts.

A roof structure of a vehicle may be coupled to both side structures along a vehicle width direction and configured to mount at least one roof module, where the roof structure includes a side upper reinforce assembly coupled to an upper interior of both side structures along a vehicle length direction and a plurality of roof rail assemblies arranged along the vehicle length direction, each being coupled to the side upper reinforce assembly by extending along the vehicle width direction into cross-sectional interior of an upper portion of both side structures.

The side upper reinforce assembly may be coupled to an upper portion of a side inner panel assembly and an upper portion of a side outer panel assembly, in the upper interior of both side structures.

The side upper reinforce assembly may include a plurality of gussets connected to the plurality of roof rail assemblies, respectively.

Each of the plurality of gussets may be connected to a support rib formed in an upper portion of a side inner panel assembly of both side structures.

The side upper reinforce assembly may include a first reinforce member coupled to an upper interior of a front side assembly of both side structures, a second reinforce member coupled to an interior of a roof side assembly of both side structures, and a third reinforce member coupled to an upper interior of a rear side assembly of both side structures.

The side upper reinforce assembly may include a first gusset formed in a front end portion of the first reinforce member, a second gusset coupled to a rear end portion of the first reinforce member and a front end portion of the second reinforce member, a third gusset coupled to a center portion of the second reinforce member, a fourth gusset coupled to a rear end portion of the second reinforce member and a front end portion of the third reinforce member, and a fifth gusset formed in a rear end portion of the third reinforce member.

The first gusset may be connected to a front pillar of the front side assembly.

The second gusset may be connected to a first door support pillar of the front side assembly.

The third gusset may be connected to the roof side assembly.

The fourth gusset may be connected to a second door support pillar of the rear side assembly.

The fifth gusset may be connected to a rear pillar of the rear side assembly.

The third gusset may include a flange portion formed in an edge portion and a forming portion extending convexly upward from the flange portion to form a closed cross-section coupled to the second reinforce member.

The plurality of roof rail assemblies may include a first roof rail assembly coupled to the first gusset, a second roof rail assembly coupled to the second gusset, a third roof rail assembly connected to the third gusset, a fourth roof rail assembly coupled to the fourth gusset, and a fifth roof rail assembly coupled to the fifth gusset.

The side upper reinforce assembly may further include a lower reinforce member coupled to a lower portion of the second reinforce member.

Each of the plurality of roof rail assemblies may include an upper rail panel and a lower rail panel that are conjoined with each other to form a closed cross-section.

The at least one roof module may include a sensor roof module, an air conditioning roof module, and a glass roof module that are disposed adjacent to each other along the vehicle length direction.

An assembly method of a roof structure of a vehicle includes providing a side upper reinforce assembly that may include a plurality of reinforce members and a plurality of gussets, coupling the side upper reinforce assembly, an upper portion of a side inner panel assembly, and a side outer panel assembly, and coupling a plurality of roof rail assemblies to the plurality of gussets along a vehicle width direction.

In the providing the side upper reinforce assembly, a rear end portion of a first reinforce member may be coupled to a front end portion of a second reinforce member through a second gusset where a first gusset is formed in a front end portion of the first reinforce member, a third gusset may be coupled to a center portion of the second reinforce member, and a rear end portion of the second reinforce member may be coupled to a front end portion of a third reinforce member through a fourth gusset where a fifth gusset is formed in a rear end portion of the third reinforce member.

In the coupling of the side upper reinforce assembly, an upper portion of a side inner panel assembly, and a side outer panel assembly, the side upper reinforce assembly may be disposed between an upper portion of the side inner panel assembly and an upper portion of the side outer panel assembly that are coupled to each other, and the plurality of gussets may be connected to a support rib formed in the upper portion of the side inner panel assembly.

In the coupling the plurality of roof rail assemblies, the plurality of roof rail assemblies may extend into cross-sectional interiors of the upper portion of the side inner panel assembly and the upper portion of the side outer panel assembly through the plurality of gussets.

In the coupling the plurality of roof rail assemblies, the plurality of roof rail assemblies in which an upper rail panel and a lower rail panel may be conjoined a closed cross-section is provided.

The assembly method may further include, after the coupling the plurality of roof rail assemblies, mounting an at least one roof module on the plurality of roof rail assemblies.

According to an exemplary embodiment, connectivity, strength, durability, impact absorbance, and NVH performance of the vehicle body configured in the one-box design may be improved.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude the presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly through one or more intermediary components, for example, by welding, serf-piercing riveting (SPR), or structural bonding.

It is understood that the term "vehicle," "vehicular," "car," or other similar term as used herein is inclusive of, in general, passenger automobiles including sports cars, sport utility vehicles (SUVs), buses, trucks, various commercial vehicles, and inclusive of hybrid vehicles, electric vehicles, hybrid electric vehicles, hydrogen-powered vehicles, purpose built vehicles (PBVs), and other alternative fuel vehicles (e.g., fuels derived from resources other than petroleum).

Hereinafter, embodiments of the present disclosure are described in detail with reference to the accompanying drawings.

Figure 1:
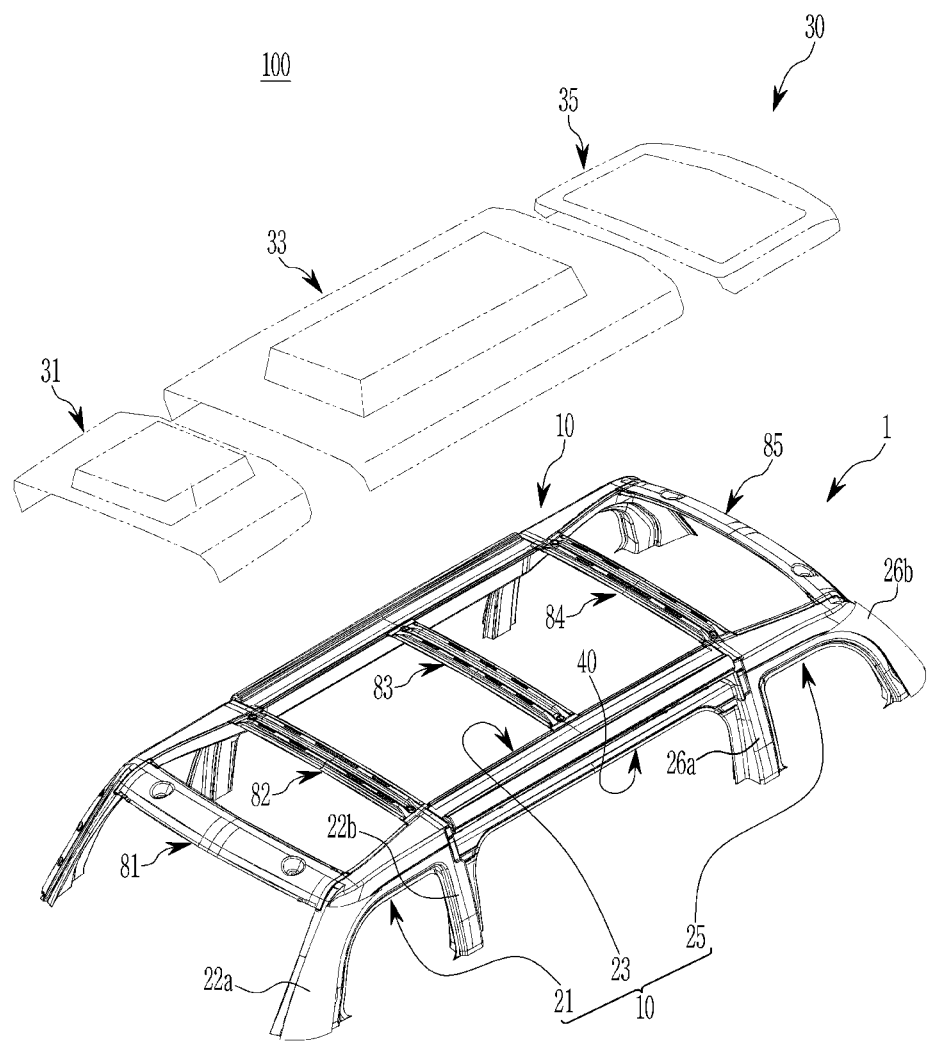
FIG. 1 is a perspective view illustrating a roof structure of a vehicle according to an exemplary embodiment.
Figure 2:
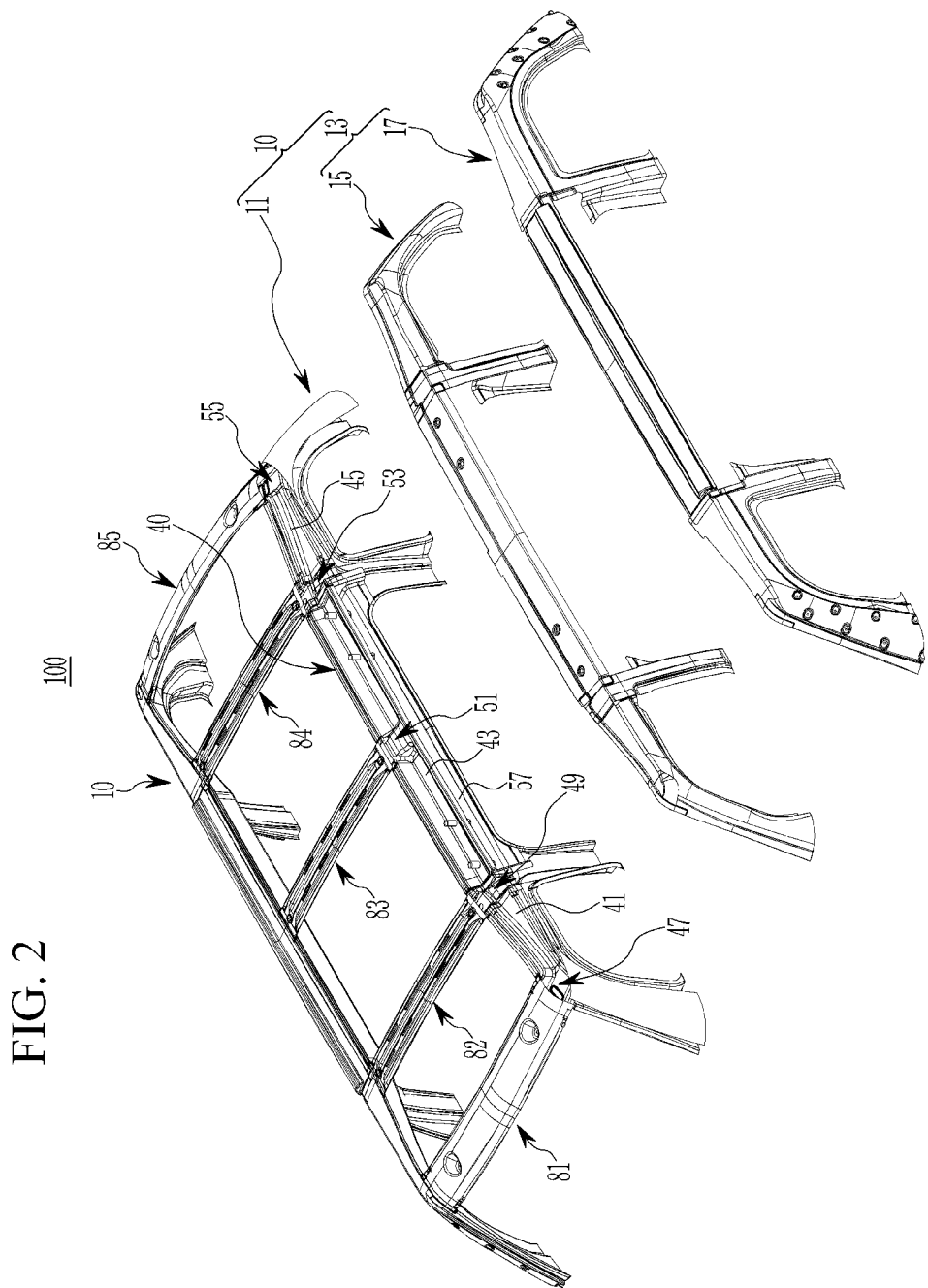
FIG. 2 is an exploded perspective view illustrating a roof structure of a vehicle according to an exemplary embodiment.

FIG. 1 is a perspective view illustrating a roof structure of a vehicle according to an exemplary embodiment. FIG. 2 is an exploded perspective view illustrating a roof structure of a vehicle according to an exemplary embodiment.

Referring to FIG. 1 and FIG. 2, a roof structure wo of a vehicle according to an exemplary embodiment may be applied to a vehicle body of, for example, a purpose-built mobility vehicle (e.g., a purpose-built vehicle; hereinafter called a PBV).

In an example, the PBV may be used as an electric vehicle-based life module vehicle that provides various services to passengers while moving to a destination on the ground in an unmanned autonomous driving method. The life module vehicle is typically called a robo-taxi, a robo-shuttle, or a hailing vehicle, by a person of ordinary skill in the art.

Such a PBV may be manufactured in a one-box design that provides a large interior space. In addition, the PBV may be applied with facing type seats to provide a wide interior space.

The body of the PBV includes a skateboard type underbody (not shown) (frequently called a "rolling chassis" or "chassis frame" by those skilled in the art), and an upper body 1 assembled to the underbody.

A battery assembly, a drive motor, and the like may be mounted on the underbody. In addition, the upper body 1 is a body-in-white (BIW) body coupled to the underbody and may configure a cabin with a large interior space.

In this disclosure, with reference to the vehicle body, a vehicle body back-and-forth direction (i.e., a vehicle length direction or longitudinal direction), a vehicle width direction (i.e., a vehicle transverse direction), and a vertical direction (i.e., a vehicle height direction) may be taken as reference directions in describing constituent elements.

Furthermore, in this specification, "upper end portion", "upper portion", "upper end", or "upper portion surface" of a component indicates an end portion, portion, end, or surface of the component that is relatively positioned higher in the drawing, and "lower end portion", "lower portion", "lower end", or "lower portion surface" of a component indicates an end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

Meanwhile, the upper body 1 includes a side structure 10 provided at both sides in the vehicle width direction and the roof structure 100 of a vehicle according to an exemplary embodiment that is coupled to upper portions of the side structures 10.

In an exemplary embodiment, each of the side structures 10 includes a side inner panel assembly 11 and a side outer panel assembly 13.

The side inner panel assembly 11 and the side outer panel assembly 13 are coupled to each other along the vehicle width direction and may be configured in the side complete manner in which they are assembled to the underbody.

Here, the side outer panel assembly 13 includes a side outer reinforce member 15 substantially coupled to the side inner panel assembly 11 and a side outer member 17 coupled to the side outer reinforce member 15.

Furthermore, each of the side structures 10 includes a front side assembly 21, a roof side assembly 23, and a rear side assembly 25.

The front side assembly 21 includes a front pillar 22a and a first door support pillar 22b. The rear side assembly 25 includes a second door support pillar 26a and a rear pillar 26b.

In addition, the roof side assembly 23 is coupled to upper portions of the first door support pillar 22b and the second door support pillar 26a along the vehicle length direction. The roof side assembly 23, the first door support pillar 22b, and the second door support pillar 26a are configured to support a door (e.g., a swing door).

The roof structure 100 of a vehicle according to an exemplary embodiment may be mounted on the upper portions of the side structures 10. In the PBV of the one-box design, the roof structure wo of a vehicle may provide a wide interior space to the occupants.

Furthermore, the roof structure 100 of a vehicle according to an exemplary embodiment includes at least one roof module 30. The at least one roof module 30 may be configured as a roof of the vehicle body. The at least one roof module 30 may include functional parts such as various operating systems and glass (or a solar roof) of the PBV.

In an example, the at least one roof module 30 may include a sensor roof module 31, an air conditioning roof module 33, and a glass roof module 35 that are disposed adjacent to each other along the vehicle length direction.

Here, the sensor roof module 31 may be mounted on an upper portion of the front side assembly 21 of the side structures 10. The sensor roof module 31 may include autonomous driving sensors such as a camera, a lidar, a radar, and the like.

The air conditioning roof module 33 may be mounted on the roof side assembly 23 of the side structures 10. The air conditioning roof module 33 may include a ceiling type air conditioner system.

In addition, the glass roof module 35 may be mounted on an upper portion of the rear side assembly 25 of the side structures 10. The glass roof module 35 may include sunroof glass.

The roof structure 100 of a vehicle according to an exemplary embodiment is structured such that connectivity and strength of the vehicle body may be improved and mounting strength of the at least one roof module 30 may be secured.

For such a purpose, the roof structure 100 of a vehicle according to an exemplary embodiment includes a side upper reinforce assembly 40 and a plurality of roof rail assemblies 81, 82, 83, 84, and 85.

In an exemplary embodiment, the side upper reinforce assembly 40 is configured to reinforce the strength of the upper portions of the side structures 10 and the roof strength of the vehicle body.

The side upper reinforce assembly 40 is coupled to an upper interior of the side structures 10 along the vehicle length direction. In the upper interior of the side structures 10, the side upper reinforce assembly 40 may be welded to an upper portion of the side inner panel assembly 11 and an upper portion of the side outer panel assembly 13.

The side upper reinforce assembly 40 may be disposed along the vehicle length direction between the upper portion of the side inner panel assembly 11 and the upper portion of the side outer panel assembly 13 that are coupled to each other.

Here, the side upper reinforce assembly 40 may be coupled to the upper portion of the side inner panel assembly 11 along the vehicle length direction and may be coupled to an upper portion of the side outer reinforce member 15 of the side outer panel assembly 13.

In addition, the side outer reinforce member 15 of the side outer panel assembly 13 and the side inner panel assembly 11 may be coupled to each other interposing the side upper reinforce assembly 40.

Figure 3A:
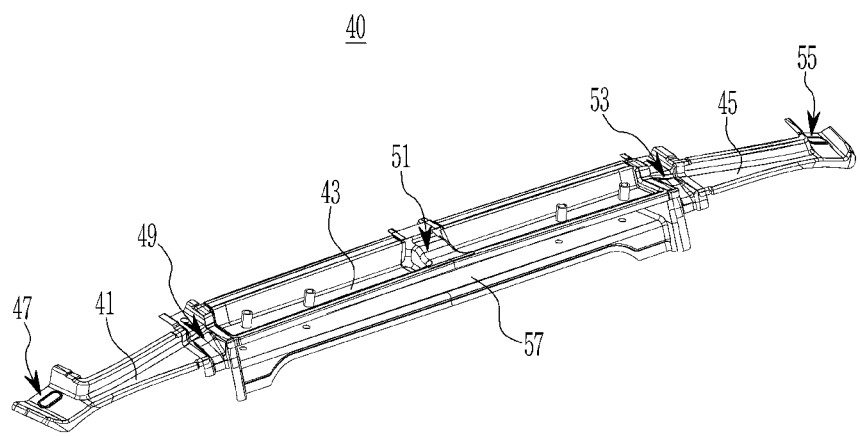
FIG. 3A and FIG. 3B are perspective views illustrating a side upper reinforce assembly applied to a roof structure of a vehicle according to an exemplary embodiment.
Figure 3B:
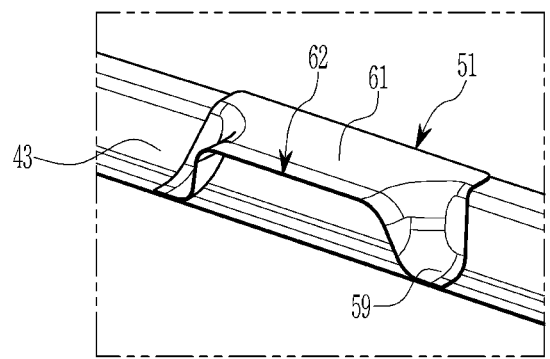
Figure 4:
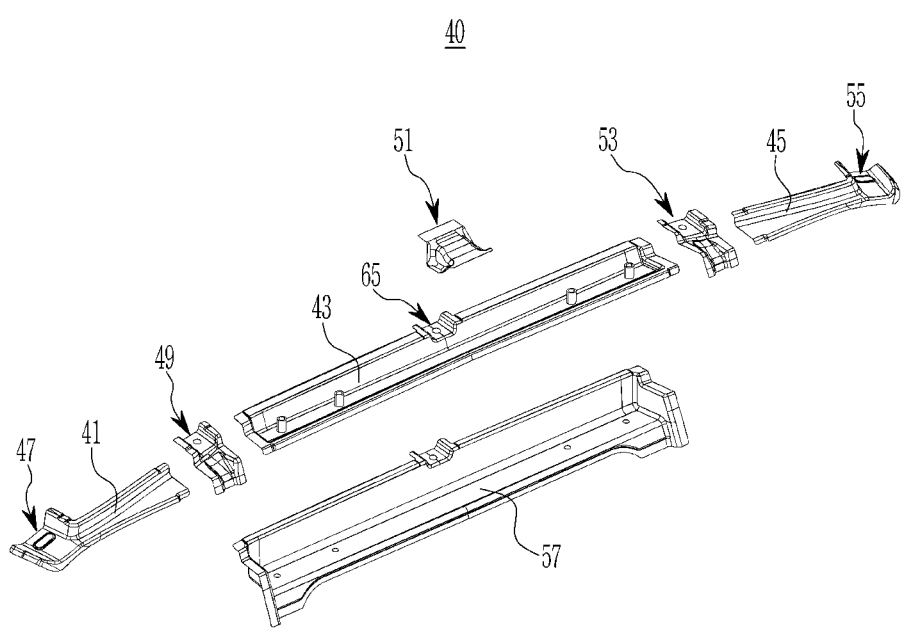
FIG. 4 is an exploded perspective view illustrating a side upper reinforce assembly applied to a roof structure of a vehicle according to an exemplary embodiment.

FIG. 3A and FIG. 3B are perspective views illustrating a side upper reinforce assembly applied to a roof structure of a vehicle according to an exemplary embodiment. FIG. 4 is an exploded perspective view illustrating a side upper reinforce assembly applied to a roof structure of a vehicle according to an exemplary embodiment.

Referring to FIG. 1 to FIG. 4, the side upper reinforce assembly 40 according to an embodiment includes a plurality of reinforce members 41, 43, and 45, a plurality of gussets 47, 49, 51, 53, and 55, and a lower reinforce member 57.

Here, the plurality of reinforce members 41, 43, and 45 may include a first reinforce member 41, a second reinforce member 43, and a third reinforce member 45. In addition, the plurality of gussets 47, 49, 51, 53, and 55 may include a first gusset 47, a second gusset 49, a third gusset 51, a fourth gusset 53, and a fifth gusset 55.

The first reinforce member 41 is coupled to an upper interior of the front side assembly 21 in the side structures 10. The second reinforce member 43 is coupled to an interior of the roof side assembly 23 in the side structures 10. In addition, the third reinforce member 45 is coupled to an upper interior of the rear side assembly 25 in the side structures 10.

Here, the second reinforce member 43 may be formed in a shape extending concavely downward from both edge portions along the vehicle width direction.

The first gusset 47 is formed in a front end portion of the first reinforce member 41. The second gusset 49 is welded to a rear end portion of the first reinforce member 41 and a front end portion of the second reinforce member 43. The third gusset 51 is welded to a center portion of the second reinforce member 43. The fourth gusset 53 is welded to a rear end portion of the second reinforce member 43 and a front end portion of the third reinforce member 45. In addition, the fifth gusset 55 is formed in a rear end portion of the third reinforce member 45.

Here, the first reinforce member 41 and the second reinforce member 43 may be coupled to each other along the vehicle length direction through the second gusset 49. In addition, the second reinforce member 43 and the third reinforce member 45 may be coupled to each other along the vehicle length direction through the fourth gusset 53.

Furthermore, the third gusset 51 may be coupled to a concave portion and both edge portions of the second reinforce member 43. The third gusset 51 includes a flange portion 59 and a forming portion 61.

The flange portion 59 may be formed in an edge portion of the third gusset 51 and may be welded to the concave portion and both edge portions of the second reinforce member 43. In addition, the forming portion 61 extends convexly upward from the flange portion 59 to form a closed cross-section 62 coupled to the second reinforce member 43.

The lower reinforce member 57 may be configured to substantially support a swing door. The lower reinforce member 57 may be welded to a lower portion of the second reinforce member 43.

Meanwhile, as described above, the first reinforce member 41, the second reinforce member 43, the third reinforce member 45, and the lower reinforce member 57 are coupled to the upper portion of the side inner panel assembly 11 and the upper portion of the side outer panel assembly 13.

Accordingly, the first gusset 47 may be connected to the front pillar 22a of the front side assembly 21. The second gusset 49 may be connected to the first door support pillar 22b of the front side assembly 21. The third gusset 51 may be connected to the roof side assembly 23. The fourth gusset 53 may be connected to the second door support pillar 26a of the rear side assembly 25. In addition, the fifth gusset 55 may be connected to the rear pillar 26b of the rear side assembly 25.

Figure 5A:
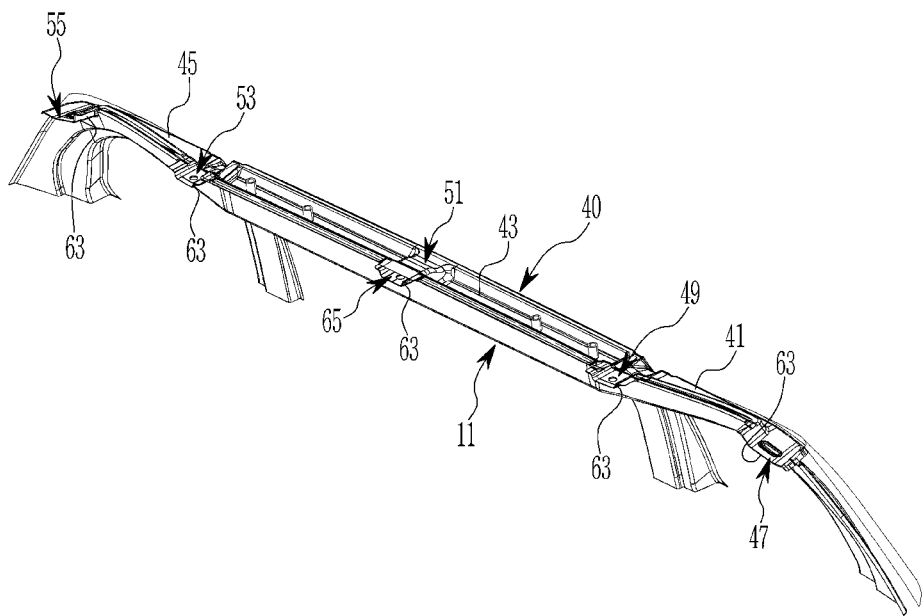
FIG. 5A and FIG. 5B are respectively drawings illustrating a coupling structure of a plurality of gussets applied to a roof structure of a vehicle according to an exemplary embodiment.
Figure 5B:
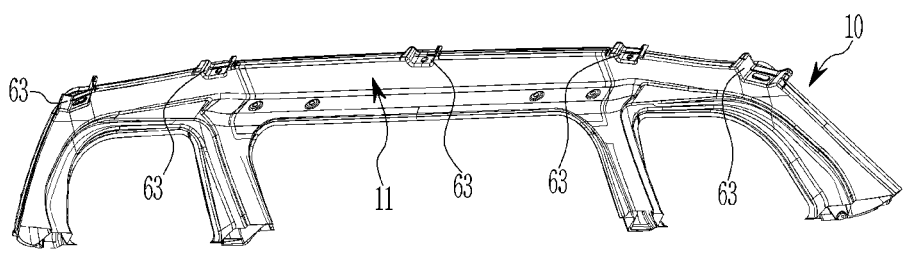

On the other hand, as shown in FIG. 5A and FIG. 5B, each of the plurality of gussets 47, 49, 51, 53, and 55 may be connected to a support rib 63 formed in the upper portion of the side inner panel assembly 11 of the side structures 10.

Here, each of the first gusset 47, the second gusset 49, the fourth gusset 53, and the fifth gusset 55 is coupled to the support rib 63. Furthermore, the second reinforce member 43 includes a rib coupling portion 65 coupled to the support rib 63. The third gusset 51 is coupled to the rib coupling portion 65.

Figure 6:
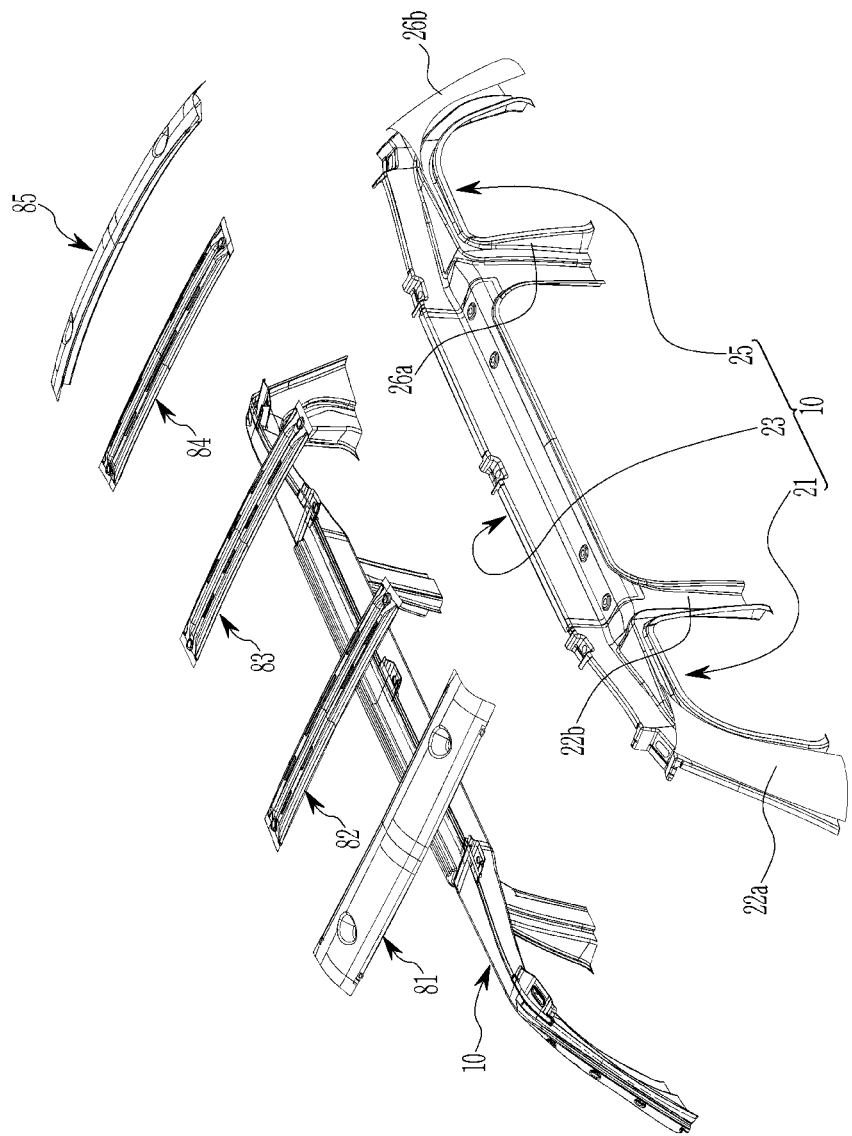
FIG. 6, FIG. 7A, and FIG. 7B are drawings illustrating roof rail assemblies applied to a roof structure of a vehicle according to an exemplary embodiment.
Figure 7A:
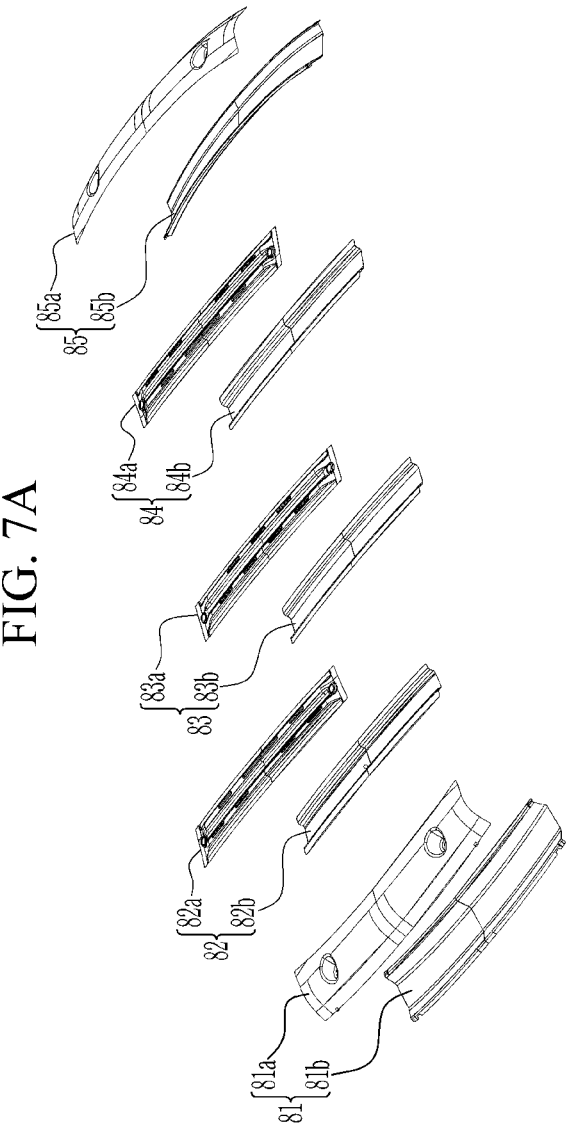
Figure 7B:
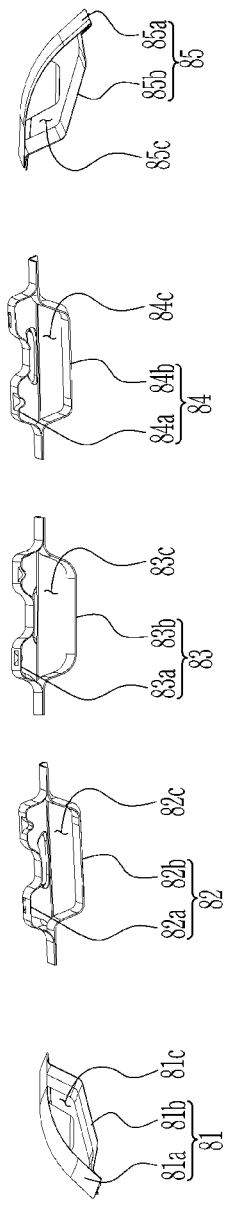

FIG. 6, FIG. 7A, and FIG. 7B are drawings illustrating roof rail assemblies applied to a roof structure of a vehicle according to an exemplary embodiment.

Referring to FIG. 6, FIG. 7A, and FIG. 7B together with FIG. 1 and FIG. 2, in an exemplary embodiment, the plurality of roof rail assemblies 81, 82, 83, 84, and 85 are configured to mount the at least one roof module 30.

The plurality of roof rail assemblies 81, 82, 83, 84, and 85 are coupled to the upper portions of the side structures 10 along the vehicle width direction and may be spaced apart from each other at a preset interval along the vehicle length direction.

In addition, the plurality of roof rail assemblies 81, 82, 83, 84, and 85 according to an embodiment may be coupled to the side upper reinforce assembly 40 by extending along the vehicle width direction into a cross-sectional interior of the upper portions of the side structures 10. Furthermore, the plurality of roof rail assemblies 81, 82, 83, 84, and 85 may be connected to the plurality of gussets 47, 49, 51, 53, and 55, respectively.

Here, the plurality of roof rail assemblies 81, 82, 83, 84, and 85 includes a first roof rail assembly 81, a second roof rail assembly 82, a third roof rail assembly 83, a fourth roof rail assembly 84, and a fifth roof rail assembly 85.

Figure 8A:
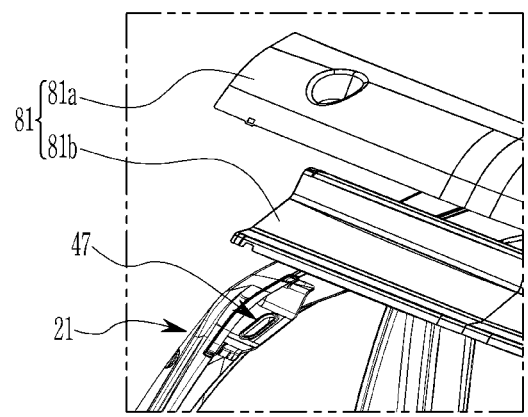
FIG. 8A to FIG. 12B are respectively drawings illustrating a coupling structure of a roof rail assembly applied to a roof structure of a vehicle according to an exemplary embodiment.
Figure 8B:
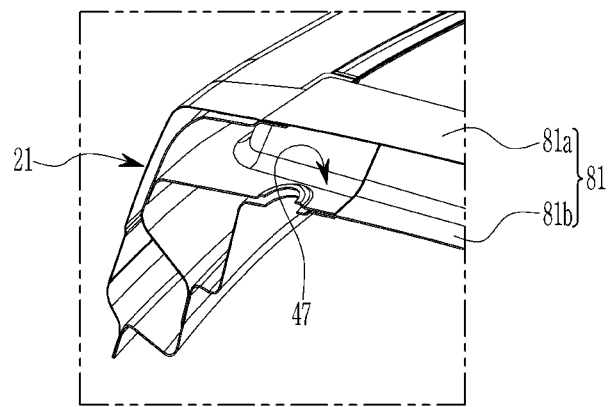

The first roof rail assembly 81 is disposed on the front pillar 22a of the front side assembly 21 in the side structures 10. As shown in FIG. 8A to FIG. 8B, the first roof rail assembly 81 may be coupled to the first gusset 47 by extending along the vehicle width direction into a cross-sectional interior of the upper portion of the front side assembly 21. The first roof rail assembly 81 includes a first upper rail panel 81a and a first lower rail panel 81b. The first upper rail panel 81a and the first lower rail panel Mare conjoined with each other along the vertical direction. The first upper rail panel 81a and the first lower rail panel 81b that are conjoined with each other may form a closed cross-section 81c. Here, both end portions of the first upper rail panel 81a may be welded to the upper portion of the front side assembly 21. In addition, both end portions of the first lower rail panel 81b may be welded to the first gusset 47.

Figure 9A:
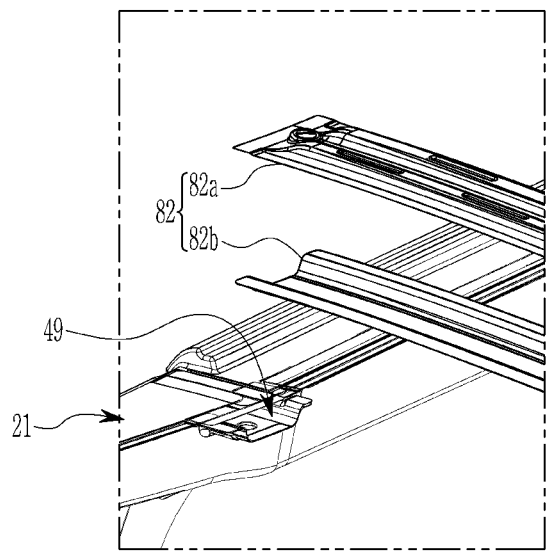
Figure 9B:
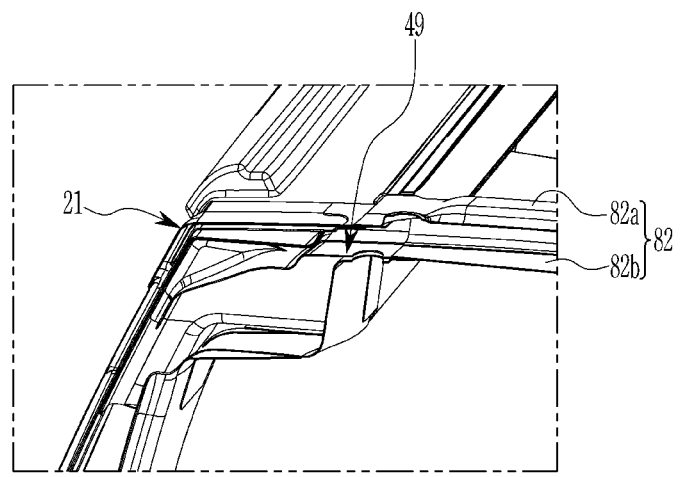

The second roof rail assembly 82 is disposed on the first door support pillar 22b of the front side assembly 21 in the side structures 10. As shown in FIG. 9A and FIG. 9B, the second roof rail assembly 82 may be coupled to the second gusset 49 by extending along the vehicle width direction into a cross-sectional interior of the upper portion of the front side assembly 21. The second roof rail assembly 82 includes a second upper rail panel 82a and a second lower rail panel 82b. The second upper rail panel 82a and the second lower rail panel 82b are conjoined with each other along the vertical direction. The second upper rail panel 82a and the second lower rail panel 82b that are conjoined with each other may form a closed cross-section 82c. Here, both end portions of the second upper rail panel 82a may be welded to the upper portion of the front side assembly 21. In addition, both end portions of the second lower rail panel 82b may be welded to the second gusset 49.

Figure 10A:
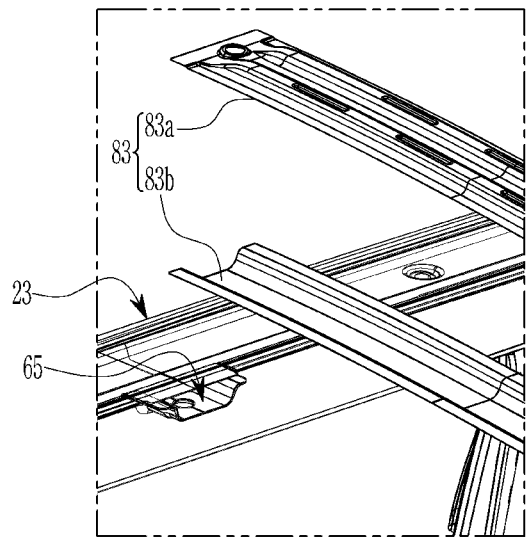
Figure 10B:
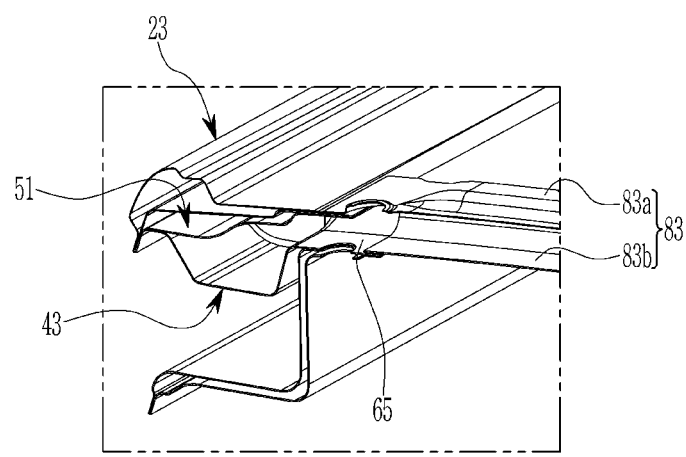

The third roof rail assembly 83 is disposed on the center of the roof side assembly 23 in the side structures 10. As shown in FIG. 10A and FIG. 10B, the third roof rail assembly 83 may be connected to the third gusset 51 by extending along the vehicle width direction into a cross-sectional interior of the roof side assembly 23. The third roof rail assembly 83 includes a third upper rail panel 83a and a third lower rail panel 83b. The third upper rail panel 83a and the third lower rail panel 83b are conjoined with each other along the vertical direction. The third upper rail panel 83a and the third lower rail panel 83b that are conjoined with each other may form a closed cross-section 83c. Here, both end portions of the third upper rail panel 83a may be welded to an upper portion of the roof side assembly 23. In addition, both end portions of the third lower rail panel 83b may be welded to the rib coupling portion 65 of the second reinforce member 43 and may be connected to the third gusset 51.

Figure 11A:
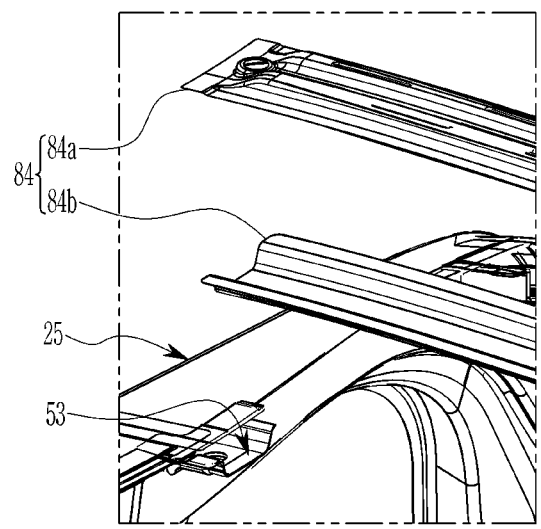
Figure 11B:
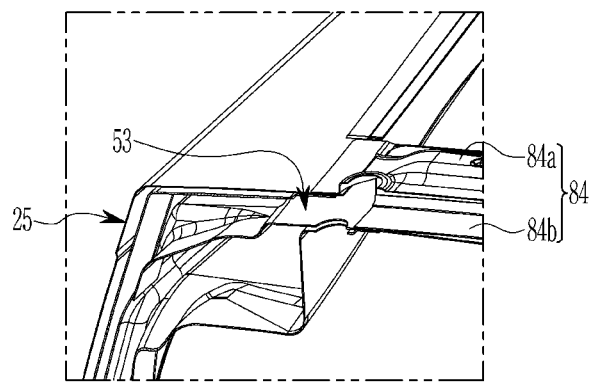

The fourth roof rail assembly 84 is disposed on the second door support pillar 26a of the rear side assembly 25 in the side structures 10. As shown in FIG. 11A and FIG. 11B, the fourth roof rail assembly 84 may be coupled to the fourth gusset 53 by extending along the vehicle width direction into a cross-sectional interior of the upper portion of the rear side assembly 25. The fourth roof rail assembly 84 includes a fourth upper rail panel 84a and a fourth lower rail panel 84b. The fourth upper rail panel 84a and the fourth lower rail panel 84b are conjoined with each other along the vertical direction. The fourth upper rail panel 84a and the fourth lower rail panel 84b that are conjoined with each other may form a closed cross-section 84c. Here, both end portions of the fourth upper rail panel 84a may be welded to the upper portion of the rear side assembly 25. In addition, both end portions of the fourth lower rail panel 84b may be welded to the fourth gusset 53.

Figure 12A:
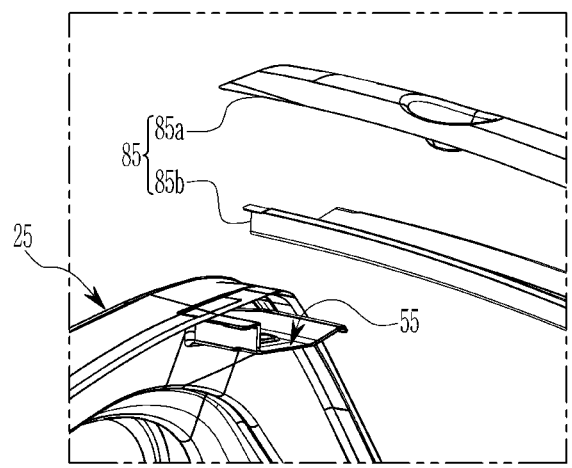
Figure 12B:
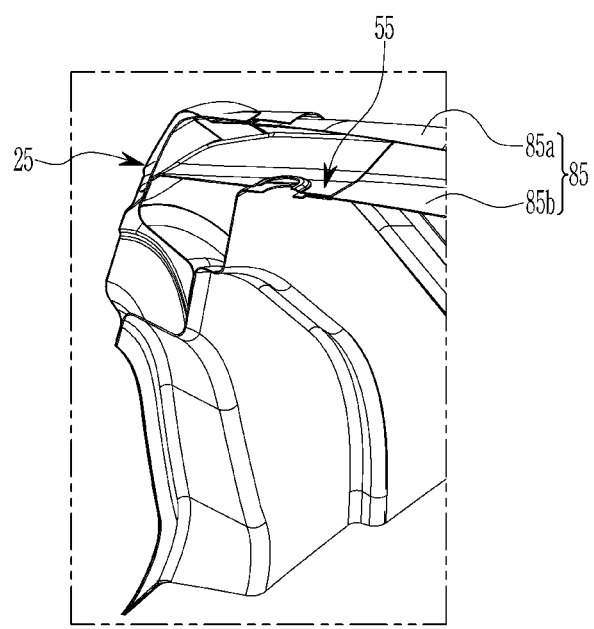

In addition, the fifth roof rail assembly 85 is disposed on the rear pillar 26b of the rear side assembly 25 in the side structures 10. As shown in FIG. 12A and FIG. 12B, the fifth roof rail assembly 85 may be coupled to the fifth gusset 55 by extending along the vehicle width direction into a cross-sectional interior of the upper portion of the rear side assembly 25. The fifth roof rail assembly 85 includes a fifth upper rail panel 85a and a fifth lower rail panel 85b. The fifth upper rail panel 85a and the fifth lower rail panel 85b are conjoined with each other along the vertical direction. The fifth upper rail panel 85a and the fifth lower rail panel 85b that are conjoined with each other may form a closed cross-section 85c. Here, both end portions of the fifth upper rail panel 85a may be welded to the upper portion of the rear side assembly 25. In addition, both end portions of the fifth lower rail panel 85b may be welded to the fifth gusset 55.

Hereinafter, an assembly method of the roof structure 100 of a vehicle according to an exemplary embodiment described above is described in detail with reference to the drawings.

First, in an exemplary embodiment, the side upper reinforce assembly 40 including the plurality of reinforce members 41, 43, and 45, the plurality of gussets 47, 49, 51, 53, and 55, and the lower reinforce member 57 are provided.

In the side upper reinforce assembly 40, the first gusset 47 is formed in the front end portion of the first reinforce member 41, and the rear end portion of the first reinforce member 41 is coupled to the front end portion of the second reinforce member 43 through the second gusset 49. The third gusset 51 is coupled to the center portion of the second reinforce member 43. The rear end portion of the second reinforce member 43 is coupled to the front end portion of the third reinforce member 45, where the fifth gusset 55 is formed in the rear end portion of the third reinforce member 45. In addition, the lower reinforce member 57 is coupled to the lower portion of the second reinforce member 43.

The side upper reinforce assembly 40 is welded to the upper portion of the side inner panel assembly 11 along the vehicle length direction. In addition, the side outer panel assembly 13 is welded to the side inner panel assembly 11 along the vehicle width direction. At this time, the side upper reinforce assembly 40 is welded to the upper portion of the side outer panel assembly 13.

Here, the side upper reinforce assembly 40 is disposed between the upper portion of the side inner panel assembly 11 and the upper portion of the side outer panel assembly 13 that are coupled to each other. In addition, the plurality of gussets 47, 49, 51, 53, and 55 are connected to the support rib 63 formed in the upper portion of the side inner panel assembly 11.

Furthermore, the first gusset 47 is connected to the front pillar 22a of the front side assembly 21. The second gusset 49 is connected to the first door support pillar 22b of the front side assembly 21. The third gusset 51 is connected to the roof side assembly 23. The fourth gusset 53 is connected to the second door support pillar 26a of the rear side assembly 25. In addition, the fifth gusset 55 is connected to the rear pillar 26b of the rear side assembly 25.

In an exemplary embodiment, the first upper rail panel 81a and the first lower rail panel 81b, are conjoined with each other, and thereby the first roof rail assembly 81 forming the closed cross-section 81c is provided. The second upper rail panel 82a and the second lower rail panel 82b are conjoined with each other, and thereby the second roof rail assembly 82 forming the closed cross-section 82c is provided. The third upper rail panel 83a and the third lower rail panel 83b are conjoined with each other, and thereby the third roof rail assembly 83 forming the closed cross-section 83c is provided. The fourth upper rail panel 84a and the fourth lower rail panel 84b are conjoined with each other, and thereby the fourth roof rail assembly 84 forming the closed cross-section 84c is provided. In addition, the fifth upper rail panel 85a and the fifth lower rail panel 85b are conjoined with each other, and thereby the fifth roof rail assembly 85 forming the closed cross-section 85c is provided.

The plurality of roof rail assemblies 81, 82, 83, 84, and 85 are coupled to the plurality of gussets 47, 49, 51, 53, and 55 along the vehicle width direction, respectively.

Here, the first roof rail assembly 81 is coupled to the upper portion of the front side assembly 21 through both end portions of the first lower rail panel 81b, and coupled to the first gusset 47 through both end portions of the first lower rail panel 81b. Accordingly, the first roof rail assembly 81 extends into a cross-sectional interior of the upper portion of the front side assembly 21 through the first gusset 47 along the vehicle width direction.

The second roof rail assembly 82 is coupled to the upper portion of the front side assembly 21 through both end portions of the second upper rail panel 82a and coupled to the second gusset 49 through both end portions of the second lower rail panel 82b. Accordingly, the second roof rail assembly 82 extends into a cross-sectional interior of the upper portion of the front side assembly 21 through the second gusset 49 along the vehicle width direction.

The third roof rail assembly 83 is welded to the upper portion of the roof side assembly 23 through both end portions of the third upper rail panel 83a and connected to the third gusset 51 through both end portions of the third lower rail panel 83b. Accordingly, the third roof rail assembly 83 extends into a cross-sectional interior of the roof side assembly 23 through the third gusset 51 along the vehicle width direction.

The fourth roof rail assembly 84 is coupled to the upper portion of the rear side assembly 25 through both end portions of the fourth upper rail panel 84a and coupled to the fourth gusset 53 through both end portions of the fourth lower rail panel 84b. Accordingly, the fourth roof rail assembly 84 extends into a cross-sectional interior of the upper portion of the rear side assembly 25 through the fourth gusset 53 along the vehicle width direction.

In addition, the fifth roof rail assembly 85 is coupled to the upper portion of the rear side assembly 25 through both end portions of the fifth upper rail panel 85a and coupled to the fifth gusset 55 through both end portions of the fifth lower rail panel 85b. Accordingly, the fifth roof rail assembly 85 extends into a cross-sectional interior of the upper portion of the rear side assembly 25 through the fifth gusset 55 along the vehicle width direction.

Finally, the at least one roof module 30 is mounted on the plurality of roof rail assemblies 81, 82, 83, 84, and 85.

Here, the at least one roof module 30 may be mounted on the plurality of roof rail assemblies 81, 82, 83, 84, and 85 by a mechanical coupling method. Furthermore, an area between the at least one roof module 30 and the plurality of roof rail assemblies 81, 82, 83, 84, and 85 may be sealed by a sealer. Furthermore, an area between the at least one roof module 3o disposed adjacent to each other may be sealed through a weather strip.

According to the roof structure 100 of a vehicle according to an exemplary embodiment as described above, the plurality of roof rail assemblies 81, 82, 83, 84, and 85 are coupled to the side upper reinforce assembly 40 and may extend into cross-sectional interiors of the upper portions of the side structures 10 through the side upper reinforce assembly 40.

In addition, according to the roof structure 100 of a vehicle according to an embodiment, the at least one roof module 30 may by supported by the plurality of roof rail assemblies 81, 82, 83, 84, and 85 forming the closed cross-sections 81c, 82c, 83c, 84c, and 85c.

Therefore, according to the roof structure 100 of a vehicle according to an embodiment, the load input through the at least one roof module 30 may be effectively dispersed to the side structures 10 through the plurality of roof rail assemblies 81, 82, 83, 84, and 85 and the side upper reinforce assembly 40.

Accordingly, according to the roof structure 100 of a vehicle according to an embodiment, connectivity, strength, durability, impact absorbance, and NVH performance of the vehicle body configured in the one-box design may be improved.

Furthermore, according to the roof structure 100 of a vehicle according to an embodiment, a wide interior space of the PBV may be secured through the at least one roof module 30 mounted with various functional parts, and extensibility of the PBV concept may be promoted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A roof structure of a vehicle, the roof structure being couplable to side structures disposed along a vehicle width direction and being configured to mount a roof module, the roof structure comprising:
    a side upper reinforce assembly coupled to an upper interior of the side structures along a vehicle length direction, wherein the side upper reinforce assembly comprises:
        a first reinforce member coupled to an upper interior of a front side assembly of the side structures,
        a second reinforce member coupled to an interior of a roof side assembly of the side structures,
        a third reinforce member coupled to an upper interior of a rear side assembly of the side structures,
        a first gusset disposed in a front end portion of the first reinforce member,
        a second gusset coupled to a rear end portion of the first reinforce member and a front end portion of the second reinforce member,
        a third gusset coupled to a center portion of the second reinforce member,
        a fourth gusset coupled to a rear end portion of the second reinforce member and a front end portion of the third reinforce member, and
        a fifth gusset disposed in a rear end portion of the third reinforce member; and
    a plurality of roof rail assemblies arranged along the vehicle length direction, each of the plurality of roof rail assemblies being coupled to the side upper reinforce assembly by extending along the vehicle width direction into a cross-sectional interior of an upper portion of each of the side structures.

2. The roof structure of claim 1, wherein the side upper reinforce assembly is coupled to an upper portion of a side inner panel assembly and an upper portion of a side outer panel assembly in the upper interior of the side structures.

3. The roof structure of claim 1, wherein the side upper reinforce assembly comprises a plurality of gussets connected to the plurality of roof rail assemblies, respectively.

4. The roof structure of claim 3, wherein each of the plurality of gussets is connected to a support rib formed in an upper portion of a side inner panel assembly of the side structures.

5. The roof structure of claim 1, wherein:
    the first gusset is connected to a front pillar of the front side assembly;
    the second gusset is connected to a first door support pillar of the front side assembly;
    the third gusset is connected to the roof side assembly;
    the fourth gusset is connected to a second door support pillar of the rear side assembly; and
    the fifth gusset is connected to a rear pillar of the rear side assembly.

6. The roof structure of claim 1, wherein the third gusset comprises:
    a flange portion in an edge portion; and
    a forming portion extending convexly upward from the flange portion to define a closed cross-section coupled to the second reinforce member.

7. The roof structure of claim 1, wherein the plurality of roof rail assemblies comprises:
    a first roof rail assembly coupled to the first gusset;
    a second roof rail assembly coupled to the second gusset;
    a third roof rail assembly connected to the third gusset;
    a fourth roof rail assembly coupled to the fourth gusset; and
    a fifth roof rail assembly coupled to the fifth gusset.

8. The roof structure of claim 1, wherein the side upper reinforce assembly further comprises a lower reinforce member coupled to a lower portion of the second reinforce member.

9. The roof structure of claim 1, wherein each of the plurality of roof rail assemblies comprises an upper rail panel and a lower rail panel that are conjoined with each other to define a closed cross-section.

10. The roof structure of claim 1, wherein the roof module comprises a plurality of roof modules comprising a sensor roof module, an air conditioning roof module, and a glass roof module disposed adjacent to each other along the vehicle length direction.

11. An assembly method of a roof structure of a vehicle, the assembly method comprising:
 providing a side upper reinforce assembly comprising a plurality of reinforce members and a plurality of gussets, wherein providing the side upper reinforce assembly comprises:
  coupling a rear end portion of a first reinforce member to a front end portion of a second reinforce member through a second gusset, wherein a first gusset is provided in a front end portion of the first reinforce member,
  coupling a third gusset to a center portion of the second reinforce member, and
  coupling a rear end portion of the second reinforce member to a front end portion of a third reinforce member through a fourth gusset, wherein a fifth gusset is provided in a rear end portion of the third reinforce member;
 coupling the side upper reinforce assembly, an upper portion of a side inner panel assembly, and a side outer panel assembly; and
 coupling a plurality of roof rail assemblies to the plurality of gussets along a vehicle width direction.

12. The assembly method of claim 11, wherein coupling the side upper reinforce assembly, the upper portion of the side inner panel assembly, and the side outer panel assembly comprises:
 disposing the side upper reinforce assembly between an upper portion of the side inner panel assembly and an upper portion of the side outer panel assembly that are coupled to each other; and
 connecting the plurality of gussets to a support rib provided in the upper portion of the side inner panel assembly.

13. The assembly method of claim 12, wherein coupling the plurality of roof rail assemblies comprises extending the plurality of roof rail assemblies into cross-sectional interiors of the upper portion of the side inner panel assembly and the upper portion of the side outer panel assembly through the plurality of gussets.

14. The assembly method of claim 11, wherein each of the plurality of roof rail assemblies comprises an upper rail panel and a lower rail panel that are conjoined with each other to define a closed cross-section.

15. The assembly method of claim 11, further comprising, after coupling the plurality of roof rail assemblies, mounting a roof module on the plurality of roof rail assemblies.

16. The assembly method of claim 11, further comprising, after coupling the plurality of roof rail assemblies, mounting on the plurality of roof rail assemblies a sensor roof module, an air conditioning roof module, and a glass roof module adjacent to each other along a vehicle length direction.

17. A vehicle comprising:
 side structures disposed along a vehicle width direction, each of the side structures comprising a side inner panel assembly, a side outer panel assembly, a front side assembly, a roof side assembly, and a rear side assembly;
 a roof structure coupled to the side structures, the roof structure comprising:
  a side upper reinforce assembly coupled to an upper interior of the side structures along a vehicle length direction, the side upper reinforce assembly comprising a first reinforce member coupled to an upper interior of the front side assembly of the side structures, a second reinforce member coupled to an interior of the roof side assembly of the side structures, and a third reinforce member coupled to an upper interior of the rear side assembly of the side structures; and
  a plurality of roof rail assemblies arranged along the vehicle length direction, each of the plurality of roof rail assemblies being coupled to the side upper reinforce assembly by extending along the vehicle width direction into a cross-sectional interior of an upper portion of each of the side structures; and
 a roof module mounted on the roof structure.

18. The vehicle of claim 17, wherein the roof module comprises a plurality of roof modules comprising a sensor roof module, an air conditioning roof module, and a glass roof module disposed adjacent to each other along the vehicle length direction.

\* \* \* \* \*